United States Patent
Hamlin et al.

(10) Patent No.: US 11,430,268 B1
(45) Date of Patent: Aug. 30, 2022

(54) GENERATING AND MANAGING FINGERPRINT TEMPLATES FOR FINGERPRINT SENSORS ACROSS INFORMATION HANDLING SYSTEMS

(71) Applicant: Dell Products L.P., Round Rock, TX (US)

(72) Inventors: Daniel Lawrence Hamlin, Round Rock, TX (US); Charles Delbert Robison, Jr., Buford, GA (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/314,235

(22) Filed: May 7, 2021

(51) Int. Cl.
*G06V 40/50* (2022.01)
*G06V 40/13* (2022.01)
*G06V 40/12* (2022.01)

(52) U.S. Cl.
CPC .............. *G06V 40/50* (2022.01); *G06V 40/13* (2022.01); *G06V 40/1347* (2022.01); *G06V 40/1365* (2022.01)

(58) Field of Classification Search
None
See application file for complete search history.

(56) References Cited

U.S. PATENT DOCUMENTS

| | | | | |
|---|---|---|---|---|
| 2006/0056662 A1* | 3/2006 | Thieme | .............. | G06V 40/1347 382/115 |
| 2012/0257802 A1* | 10/2012 | Kwon | ................ | G06V 40/1365 382/124 |
| 2017/0076132 A1* | 3/2017 | Sezan | ..................... | G06F 21/32 |

* cited by examiner

*Primary Examiner* — Nicholas J Lee
(74) *Attorney, Agent, or Firm* — Baker Botts, L.L.P.

(57) ABSTRACT

Generating fingerprint templates, including receiving a fingerprint image of a user that is obtained at a first fingerprint sensor; identifying a plurality of fingerprint template creation models, each fingerprint template creation model associated with a respective other fingerprint sensor, each other fingerprint sensor differing from one another and differing from the first fingerprint sensor; applying each of the fingerprint template creation models to the fingerprint image to generate respective fingerprint templates; associating, for each generated fingerprint template, i) an identification (ID) of the other fingerprint sensor that corresponds to the fingerprint model that generated the fingerprint template and ii) a user identification (ID) of the user associated with the fingerprint image obtained at the first fingerprint sensor; and storing each of the generated fingerprint templates in a database.

20 Claims, 6 Drawing Sheets

GENERATING AND MANAGING FINGERPRINT TEMPLATES FOR FINGERPRINT SENSORS ACROSS INFORMATION HANDLING SYSTEMS

BACKGROUND

Field of the Disclosure

The disclosure relates generally to an information handling system, and in particular, generating and managing fingerprint templates for fingerprint sensors of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of generating fingerprint templates, including receiving a fingerprint image of a user that is obtained at a first fingerprint sensor; identifying a plurality of fingerprint template creation models, each fingerprint template creation model associated with a respective other fingerprint sensor, each other fingerprint sensor differing from one another and differing from the first fingerprint sensor; applying each of the fingerprint template creation models to the fingerprint image to generate respective fingerprint templates; associating, for each generated fingerprint template, i) an identification (ID) of the other fingerprint sensor that corresponds to the fingerprint model that generated the fingerprint template and ii) a user identification (ID) of the user associated with the fingerprint image obtained at the first fingerprint sensor; and storing each of the generated fingerprint templates in a database.

Other embodiments of these aspects include corresponding systems, apparatus, and computer programs, configured to perform the actions of the methods, encoded on computer storage devices.

These and other embodiments may each optionally include one or more of the following features. For instance, identifying an ID of the first fingerprint sensor; identifying a first fingerprint template associated with the ID of the first fingerprint sensor; and updating the first fingerprint template based on the fingerprint image. Each fingerprint template creation model is associated with sensor size requirements of the other fingerprint sensor that is associated with the respective fingerprint template creation model. The sensor size requirements of each fingerprint template creation model differs. Encrypting the fingerprint image. Receiving an additional fingerprint image of the user that is obtained at a second fingerprint sensor; determining a sensor ID of the second fingerprint sensor; and identifying a fingerprint template from the generated fingerprint templates that is associated with a sensor ID that matches the sensor ID of the second fingerprint sensor. Decrypting the identified fingerprint template. Applying each of the fingerprint template creation models to the fingerprint image further includes performing parallel feature extraction of the fingerprint image against each of the fingerprint template creation models to generate the respective fingerprint templates.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for generating and managing fingerprint templates for fingerprint sensors of an information handling system. In short, a fingerprint management computing module can receive a fingerprint image from a fingerprint sensor. The fingerprint sensor can be included by any computing peripheral coupled to the information handling system, or part of the information handling system. The fingerprint management computing module can apply multiple fingerprint template creation models to the single fingerprint image to generate respective fingerprint templates. The fingerprint templates can each be associated with differing types and size requirements of other fingerprint sensors. These fingerprint templates can then be used for validation of other fingerprint images that may be obtained at a later time.

Specifically, this disclosure discusses a system and a method for generating and managing fingerprint templates for fingerprint sensors of an information handling system, including receiving a fingerprint image of a user that is obtained at a first fingerprint sensor; identifying a plurality of fingerprint template creation models, each fingerprint template creation model associated with a respective other fingerprint sensor, each other fingerprint sensor differing from one another and differing from the first fingerprint sensor; applying each of the fingerprint template creation models to the fingerprint image to generate respective fingerprint templates; associating, for each generated fingerprint template, i) an identification (ID) of the other fingerprint sensor that corresponds to the fingerprint model that generated the fingerprint template and ii) a user identification (ID) of the user associated with the fingerprint image obtained at the first fingerprint sensor; and storing each of the generated fingerprint templates in a database.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
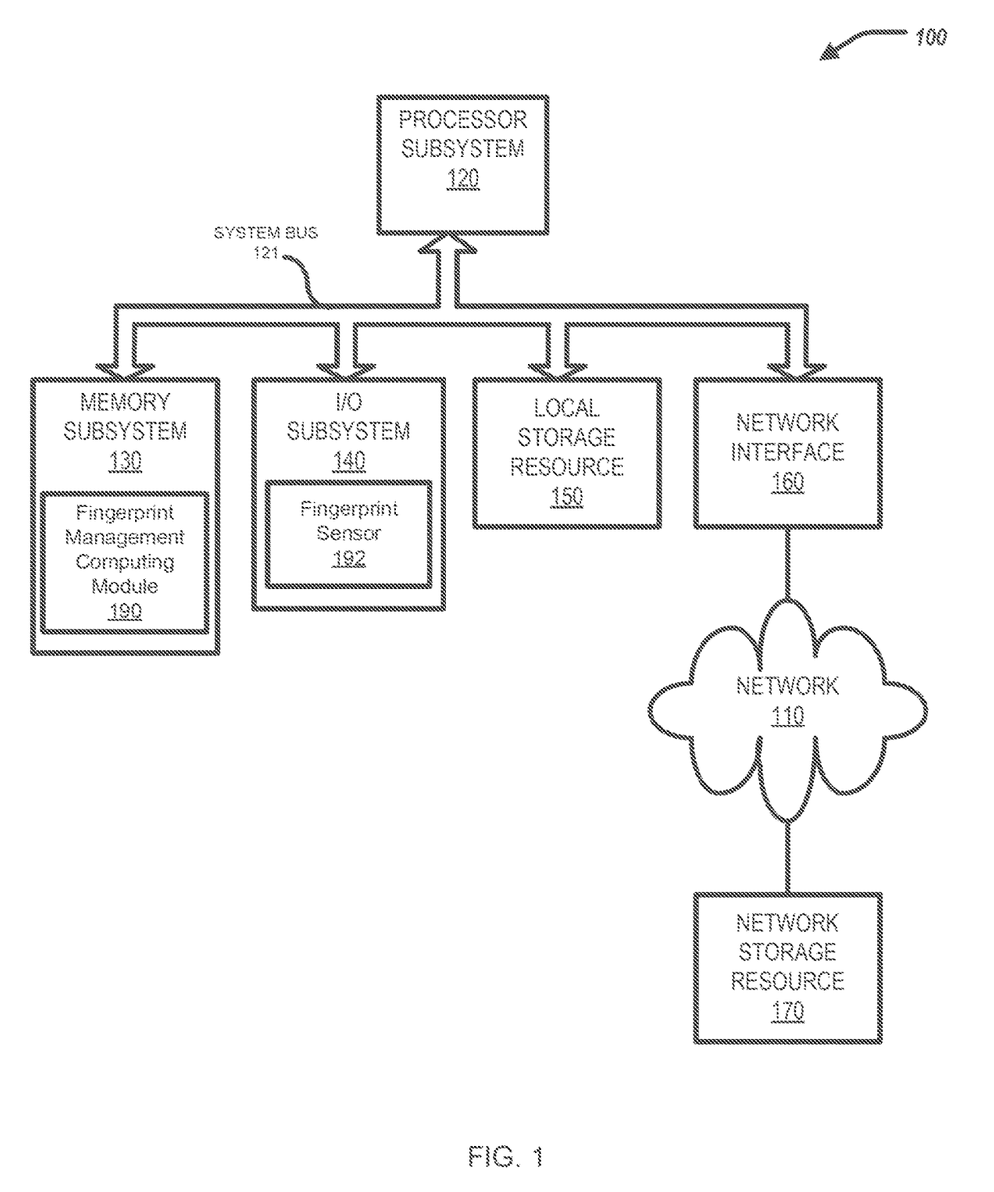
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. In some examples, the I/O subsystem 140 can further include a fingerprint sensor 192 (or multiple fingerprint sensors 192).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a fingerprint management computing module 190. The fingerprint management computing module 190 can be included by the memory subsystem 130. The fingerprint management computing module 190 can include a computer-executable program (software). The fingerprint management computing module 190 can be executed by the processor subsystem 120.

In short, the fingerprint management computing module 190 can receive a fingerprint image from a fingerprint sensor. The fingerprint sensor can be included by any computing peripheral coupled to the information handling system 100, or part of the information handling system 100. The fingerprint management computing module 190 can apply multiple fingerprint template creation models to the single fingerprint image to generate respective fingerprint templates. The fingerprint templates can each be associated with differing types and size requirements of other fingerprint sensors. These fingerprint templates can then be used for validation of other fingerprint images that may be obtained at a later time.

Figure 2:
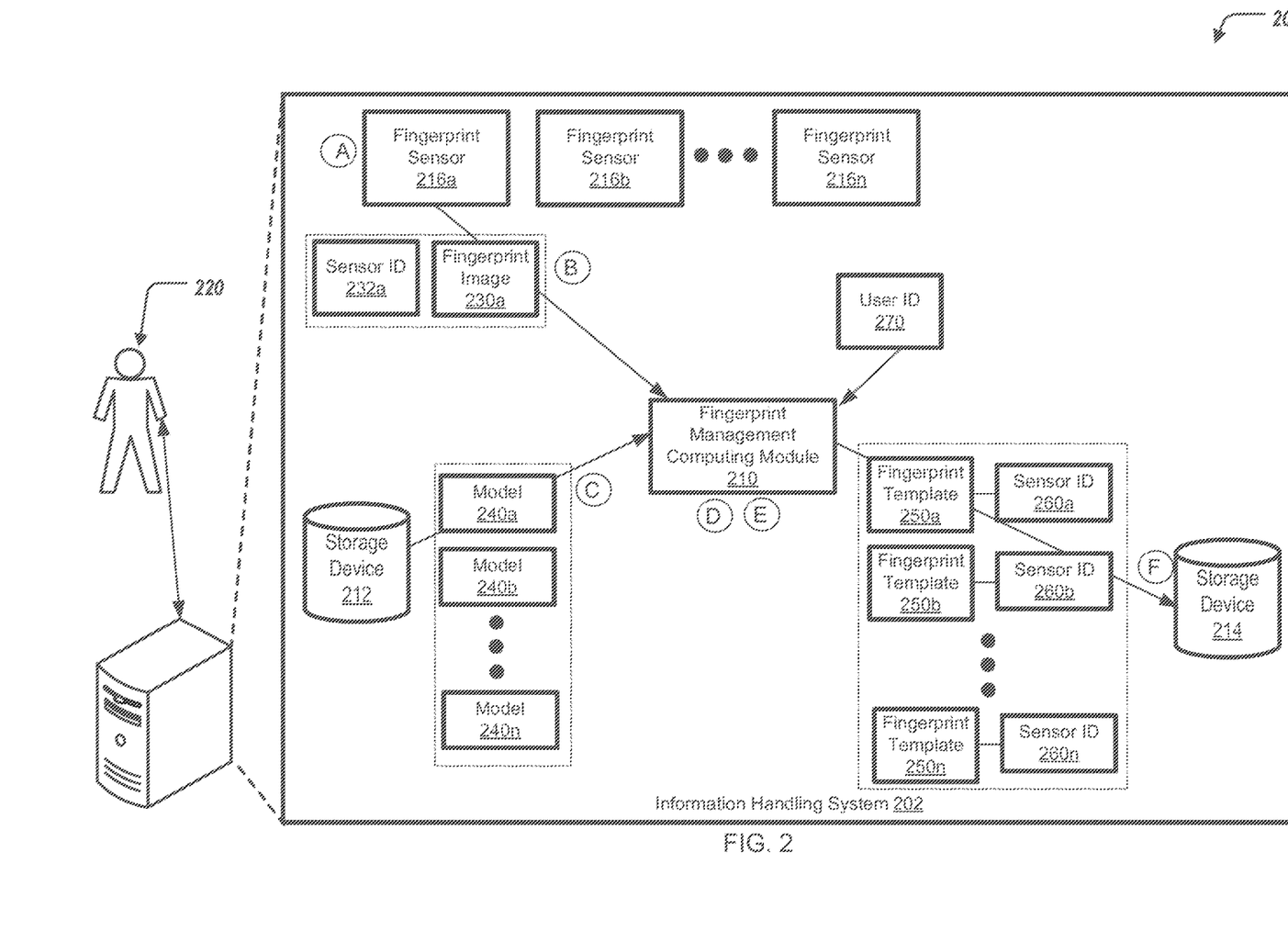
FIGS. 2, 3 illustrate respective block diagrams of an information handling system for generating and managing fingerprint templates for fingerprint sensors of an information handling system.

Turning to FIG. 2, FIG. 2 illustrates an environment 200 including an information handling system 202, for fingerprint enrollment. The information handling system 202 can include a fingerprint management computing module 210, a storage device 212, a storage device 214, and fingerprint sensors 216a, 216b, . . . , 216n (collectively referred to as fingerprint sensors 216). In some examples, the information handling system 202 is similar to, or includes, the information handling system 100 of FIG. 1. In some examples, the fingerprint management computing module 210 is the same, or substantially the same, as the fingerprint management computing module 190 of FIG. 1. In some examples, any of the fingerprint sensors 216 are the same, or substantially the same, as the fingerprint sensor 192 of FIG. 1.

The fingerprint management computing module 210 can be in communication with the storage device 212, the storage device 214, and the fingerprint sensors 216.

In some examples, each of the fingerprint sensors 216 can differ from one another. That is, each of the fingerprint sensors 216 can be of a specific type (e.g., Goodix or Synaptic) and include a particular sensor size (e.g., 4×4 or 10×10). For example, one of the fingerprint sensors 216 can be included by (associated with) the information handling system 202 and have a 10×10 sensor size. For example, one of the fingerprint sensors 216 can be included by (associated with) a keyboard input device and have a 6×6 sensor size. For example, one of the fingerprint sensors 216 can be included by (associated with) a mouse input device (handheld input device) and have a 4×4 sensor size.

The information handling system 202, and in particular, the fingerprint management computing module 210, can generate and manage fingerprint templates for the fingerprint sensors 216, described further herein. In other words, the fingerprint management computing module 210 can facilitate providing a "one-to-many" fingerprint login experience that allows authentication from the multiple fingerprint sensors 216 each having respective differing fingerprint sensor technologies.

In some examples, the fingerprint sensor 216a obtains a fingerprint image 230a of a user 220, at step A. For example, the fingerprint sensor 216a can include a fingerprint sensor of the information handling system 202 (e.g., integrated into a body of the information handling system 202). However, the fingerprint sensor 216a can be included by any device (e.g., input/output device) coupled to the information handling system 202, such as a keyboard or mouse.

The fingerprint management computing module 210 can obtain the fingerprint image 230a from the fingerprint sensor 216a, at step B. The fingerprint management computing module 210, when obtaining the fingerprint image 230a, can additionally obtain a sensor identification (ID) 232a of the fingerprint sensor 216a. The sensor ID 232a can uniquely identify the fingerprint sensor 216a, including a sensor size of the fingerprint sensor 216a and a type of the fingerprint sensor 216a (such as Goodix or Synaptic), or technology type of the fingerprint sensor 216a. The fingerprint management computing module 210 can further perform verification of the fingerprint image 230a (e.g., based on a stored/secured key). In some examples, the fingerprint management computing module 210 encrypts the fingerprint image 230a.

The fingerprint management computing module 210 can identify fingerprint template creation models 240a, 240b, . . . , 240n (collectively referred to as fingerprint template creation models 240), at step C. Specifically, the storage device 212 can store the fingerprint template creation models 240. Each of the fingerprint template creation models 240 are associated with a respective fingerprint sensor 216. For example, the fingerprint template creation model 240a is associated with the fingerprint sensor 216a; the fingerprint template creation model 240b is associated with the fingerprint sensor 216b; and the fingerprint template creation model 240n is associated with the fingerprint sensor 216n.

Moreover, each fingerprint template creation model 240 is associated with a sensor size requirement of the respective fingerprint sensor 216 that the fingerprint template creation model 240 is associated with. For example, the fingerprint template creation model 240a is associated with a sensor size requirement of the fingerprint sensor 216a (e.g., 4×4 sensor size); the fingerprint template creation model 240b is associated with a sensor size requirement of the fingerprint sensor 216b (e.g., 6×6 sensor size); and the fingerprint template creation model 240n is associated with a sensor size requirement of the fingerprint sensor 216n (e.g., 10×10 sensor size). The sensor size requirements can be included in metadata (included by metadata) associated with each fingerprint template creation model 240. In some examples, the sensor size requirements of each fingerprint template creation model 240 differs.

The fingerprint management computing module 210 can apply each of the fingerprint template creation models 240 to the fingerprint image 230a, at step D. Specifically, the fingerprint management computing module 210 can apply each of the fingerprint template creation models 240 to the fingerprint image 230a to generate respective fingerprint templates. For example, the fingerprint management computing module 210 can apply the fingerprint template creation model 240a to the fingerprint image 230a to generate the fingerprint template 250a; the fingerprint management computing module 210 can apply the fingerprint template creation model 240b to the fingerprint image 230a to generate the fingerprint template 250b; and the fingerprint management computing module 210 can apply the fingerprint template creation model 240n to the fingerprint image 230a to generate the fingerprint template 250n.

In some examples, the fingerprint management computing module 210 can apply each of the fingerprint template creation models 240 to the fingerprint image 230a by performing parallel feature extraction of the fingerprint image 230a against each of the fingerprint template creation models 240 to generate the respective fingerprint templates 250. Thus, the single fingerprint image 230a can be matched against different sensor models (e.g., different fingerprint sensors 216) by way of the fingerprint templates 250.

The fingerprint management computing module 210 associates, for each generated fingerprint template 250, a fingerprint sensor identification (ID) of the fingerprint sensor 216 that corresponds to the fingerprint template creation model 240 that generated the fingerprint template 250, at step E. For example, the fingerprint template 250a is associated with the sensor ID 260a (sensor ID 260a being the ID of the fingerprint sensor 216a); the fingerprint template 250b is associated with the sensor ID 260b (sensor ID 260b being the ID of the fingerprint sensor 216b); and the fingerprint template 250n is associated with the sensor ID 260n (sensor ID 260n being the ID of the fingerprint sensor 216n).

Moreover, the fingerprint management computing module 210 associates, for each generated fingerprint template 250, a user identification (ID) 270 of the user 220, at step E. For example, the fingerprint templates 250a, 250b, 250n are each associated with the user ID 270. Thus, each of the fingerprint templates 250 are associated with a single user ID 270.

The fingerprint management computing module 210 stores each of the generated fingerprint templates 250 at the storage device 214, at step F. That is, the fingerprint management computing module 210 stores the fingerprint templates 250 in a database at the storage device 214. The fingerprint management computing module 210 stores the fingerprint templates 250 and the associations (correspondence) of the fingerprint templates 250 with the respective sensor IDs 260; and further stores the fingerprint templates 250 and the association (correspondence) with the single user ID 270 for each of the fingerprint templates 250.

In some examples, the fingerprint management computing module 210 can identify the sensor ID 232a of the fingerprint sensor 216a. In response, the fingerprint management computing module 210 can identify a fingerprint template 250 that is associated with the sensor ID 232a of the fingerprint sensor 216a. For example, the fingerprint management computing module 210 can identify the fingerprint template 250a as being associated with (or corresponding to) the sensor ID 232a. That is, the fingerprint template 250a was previously generated prior to receiving/obtaining the fingerprint image 230a. For example, the fingerprint management computing module 210 generates the fingerprint template 250a as described herein.

The fingerprint management computing module 210 can update the (previously generated) fingerprint template 250a based on the fingerprint image 230a. Specifically, the fingerprint management computing module 210 can identify the fingerprint template creation model 240a that is associated with the sensor ID 232a; apply the fingerprint template creation module 240a to the fingerprint image 230a to generate a further fingerprint template. The fingerprint management computing module 210 can merge, or concatenate, the previously generated fingerprint template 250a with the further fingerprint template—updating the previously generated fingerprint template 250a.

Figure 3:
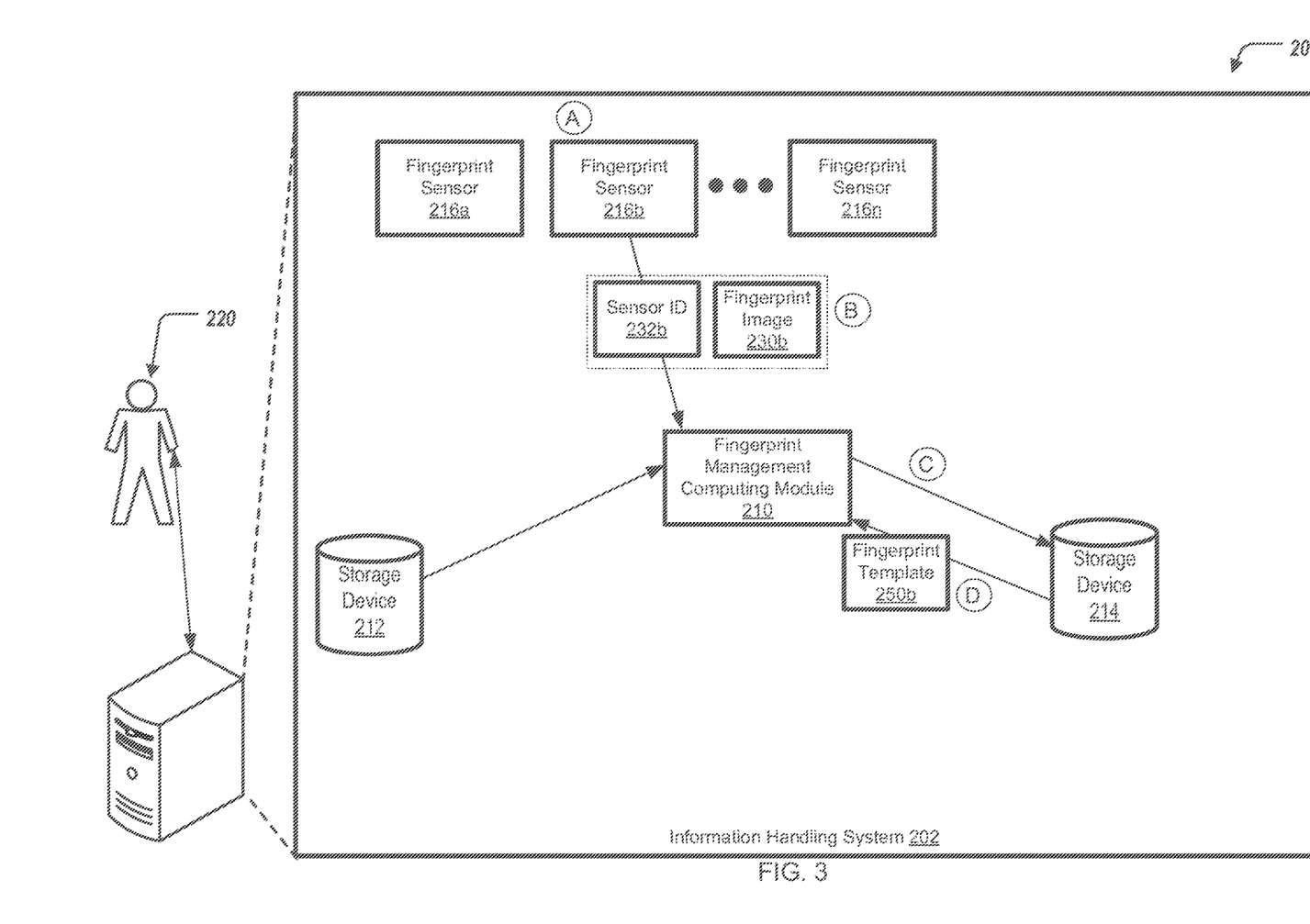

Referring to FIG. 3, the environment 200 is shown for requesting fingerprint authentication. Specifically, the fingerprint sensor 216b obtains a fingerprint image 230b of the user 220, at step A. For example, the fingerprint sensor 216b can include a fingerprint sensor of a keyboard input device coupled to the information handling system 202.

The fingerprint management computing module 210 can obtain the fingerprint image 230b from the fingerprint sensor 216b, at step B. The fingerprint management computing module 210, when obtaining the fingerprint image 230b, can additionally obtain the sensor identification (ID) 232b of the fingerprint sensor 216b. Thus, the fingerprint management computing module 210 determines (identifies) the sensor ID 232 of the fingerprint sensor 216b. The fingerprint management computing module 210 can further perform verification of the fingerprint image 230b (e.g., based on a stored/secured key). In some examples, the fingerprint management computing module 210 encrypts the fingerprint image 230b.

The fingerprint management computing module 210 communicates with the storage device 214, at step C. The fingerprint management computing module 210 identifies the fingerprint template 250b from the generated fingerprint templates (that are stored at the storage device 214), at step D. Specifically, the fingerprint management computing module 210 identifies the fingerprint template 250b (that is stored at the storage device 214) that is associated with a sensor ID 260b that matches the sensor ID 232b of the fingerprint sensor 216b. That is, the fingerprint management computing module 210 compares the sensor ID 232b that is received with the fingerprint image 230b (the sensor ID 232b indicating the fingerprint sensor 216b) with each of the sensor IDs 260 that is stored by the storage device 214. The fingerprint management computing module 210, based on the comparing, can identify the sensor ID 260b that matches the sensor ID 232b. Based on such matching, the fingerprint management computing module 210 can identify the fingerprint template 250b that is associated with (corresponds to) the sensor ID 260b. In some examples, the fingerprint management computing module 210 can determine whether the fingerprint image 230b matches with the fingerprint template 250b. For example, the fingerprint management computing module 210 can perform vector-based matching or minutia-based matching between the fingerprint image 230b and the fingerprint template 250b. In some examples, the fingerprint management computing module 210 can provide the fingerprint template 250b to any application or the operating system for matching of the fingerprint image 230b with the fingerprint template 250b.

In some examples, the fingerprint management computing module 210 can decrypt the fingerprint image 230b. For example, prior to identifying the fingerprint template 250b, the fingerprint management computing module 210 can decrypt the fingerprint image 230b (when the fingerprint image 230b is encrypted).

Figure 4:
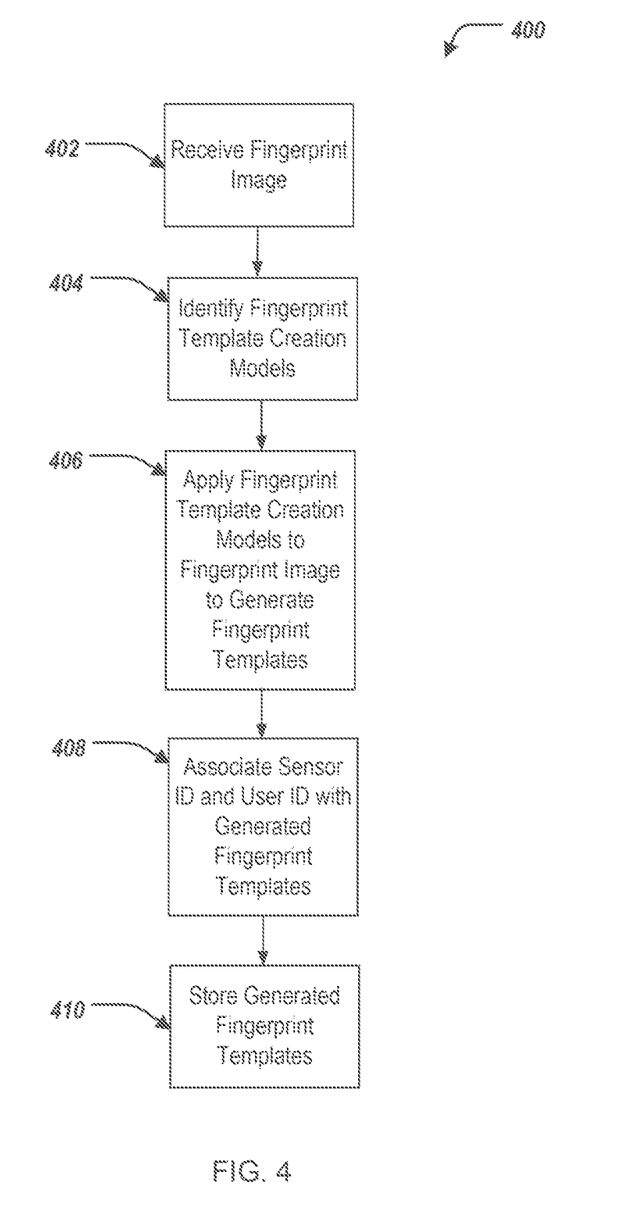
FIGS. 4-6 illustrates respective methods for generating and managing fingerprint templates for fingerprint sensors of an information handling system.

FIG. 4 illustrates a flowchart depicting selected elements of an embodiment of a method 400 for generating and managing fingerprint templates for fingerprint sensors of an information handling system, including fingerprint enrollment. The method 400 may be performed by the information handling system 100, the information handling system 202 and/or the fingerprint management computing module 210, and with reference to FIGS. 1-3. It is noted that certain operations described in method 400 may be optional or may be rearranged in different embodiments.

The fingerprint management computing module 210 receives the fingerprint image 230a of the user 220 that is obtained at the fingerprint sensor 216a (402). The fingerprint management computing module 210 identifies the fingerprint template creation models 240 (404). In some examples, each fingerprint template creation model 240 is associated with a respective fingerprint sensor 216. In some examples, each of the fingerprint sensor 216 differs from one another. The fingerprint management computing module 210 applies each of the fingerprint template creation models 240 to the fingerprint image 232a to generate respective fingerprint templates 250 (406). The fingerprint management computing module 210 associates, for each generated fingerprint template 250, i) the fingerprint sensor ID 260 that corresponds to the fingerprint model 240 that generated the fingerprint template 250 and ii) the user ID 270 of the user 220 associated with the fingerprint image 232a obtained at the fingerprint sensor 216 (408). The fingerprint management computing module 210 stores each of the generated fingerprint templates 250 at the storage device 214 (410).

Figure 5:
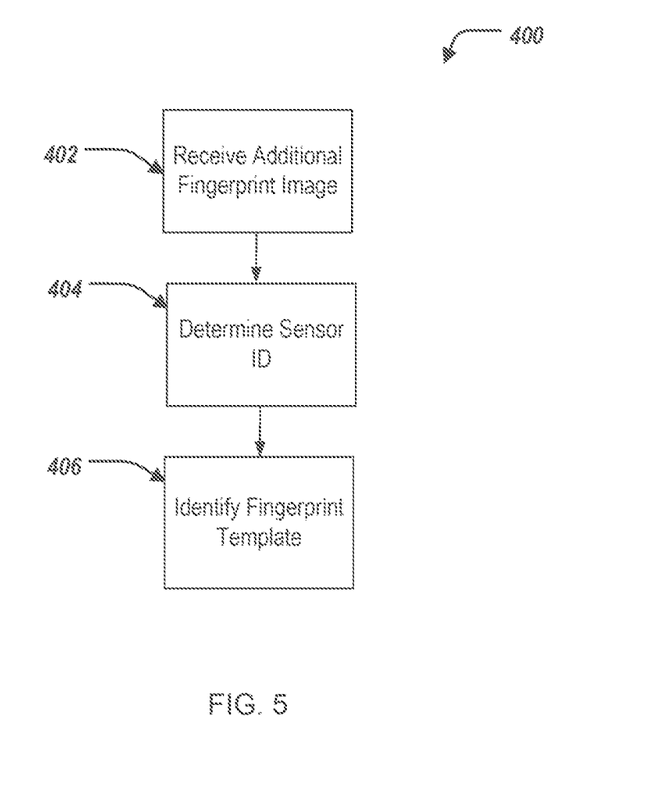

FIG. 5 illustrates a flowchart depicting selected elements of an embodiment of a method 500 for generating and managing fingerprint templates for fingerprint sensors of an information handling system, including fingerprint authentication. The method 500 may be performed by the information handling system 100, the information handling system 202 and/or the fingerprint management computing module 210, and with reference to FIGS. 1-3. It is noted that certain operations described in method 500 may be optional or may be rearranged in different embodiments.

The fingerprint management computing module 210 receives an additional fingerprint image 230b of the user 220 that is obtained at the fingerprint sensor 216b (502). The fingerprint management computing module 210 determines the sensor ID 232b of the fingerprint sensor 216b (504). The fingerprint management computing module 210 identifies the fingerprint template 250b from the generated fingerprint templates 250 that is associated with the sensor ID 260b that matches the sensor ID 232b of the fingerprint sensor 216b (506).

Figure 6:
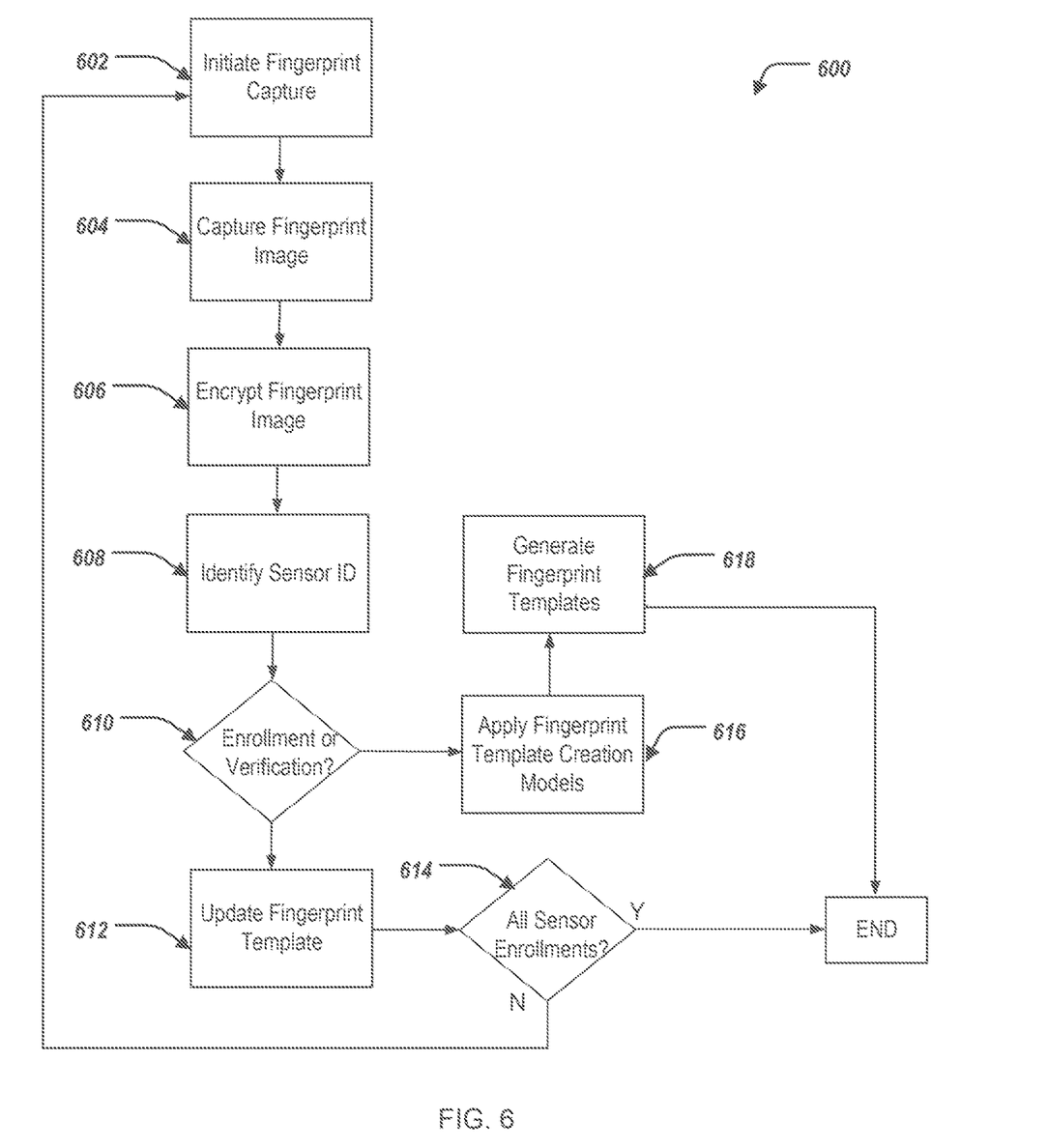

FIG. 6 illustrates a flowchart depicting selected elements of an embodiment of a method 600 for generating and managing fingerprint templates for fingerprint sensors of an information handling system. The method 600 may be performed by the information handling system 100, the information handling system 202 and/or the fingerprint management computing module 210, and with reference to FIGS. 1-3. It is noted that certain operations described in method 600 may be optional or may be rearranged in different embodiments.

The fingerprint sensor 216 initiates fingerprint capture (602). The fingerprint sensor 216 captures the fingerprint image 230 (604). The fingerprint sensor encrypts the fingerprint image 230 (606). The fingerprint management computing module 210 identifies the sensor ID 230 (608). The fingerprint management computing module 210 determines whether the fingerprint image 230 is for enrollment or verification (610). If the fingerprint management computing module 210 determines that the fingerprint image 230 is for enrollment, the fingerprint management computing module 210 updates the fingerprint template 250 (612). The fingerprint management computing module 210 determines whether all of the fingerprint sensors 216 are enrolled (614). If all of the fingerprint sensors 216 are enrolled, the process ends. If all of the fingerprint sensors 216 are not enrolled, the process returns to step 602. If the fingerprint management computing module 210 determines that the fingerprint image 230 is for verification, the fingerprint management computing module 210 applies the fingerprint template creation models 240 to the fingerprint image 230 (616). The fingerprint management computing module 210 generates the fingerprint templates 250 (618).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of generating fingerprint templates, the method comprising:
   receiving a fingerprint image of a user that is obtained at a first fingerprint sensor;
   identifying a plurality of fingerprint template creation models, each fingerprint template creation model associated with a respective other fingerprint sensor, each other fingerprint sensor differing from one another and differing from the first fingerprint sensor;
   applying each of the fingerprint template creation models to the fingerprint image to generate respective fingerprint templates;
   associating, for each generated fingerprint template, i) an identification (ID) of the other fingerprint sensor that corresponds to the fingerprint model that generated the fingerprint template and ii) a user identification (ID) of the user associated with the fingerprint image obtained at the first fingerprint sensor; and
   storing each of the generated fingerprint templates in a database.

2. The computer-implemented method of claim 1, further comprising:
   identifying an ID of the first fingerprint sensor;
   identifying a first fingerprint template associated with the ID of the first fingerprint sensor; and
   updating the first fingerprint template based on the fingerprint image.

3. The computer-implemented method of claim 1, wherein each fingerprint template creation model is associated with sensor size requirements of the other fingerprint sensor that is associated with the respective fingerprint template creation model.

4. The computer-implemented method of claim 1, wherein the sensor size requirements of each fingerprint template creation model differs.

5. The computer-implemented method of claim 1, further comprising encrypting the fingerprint image.

6. The computer-implemented method of claim 1, further comprising:
   receiving an additional fingerprint image of the user that is obtained at a second fingerprint sensor;
   determining a sensor ID of the second fingerprint sensor; and
   identifying a fingerprint template from the generated fingerprint templates that is associated with a sensor ID that matches the sensor ID of the second fingerprint sensor.

7. The computer-implemented method of claim 6, further comprising decrypting the identified fingerprint template.

8. The computer-implemented method of claim 1, wherein applying each of the fingerprint template creation models to the fingerprint image further includes performing parallel feature extraction of the fingerprint image against each of the fingerprint template creation models to generate the respective fingerprint templates.

9. An information handling system comprising a processor having access to memory media storing instructions executable by the processor to perform operations comprising, comprising:
   receiving a fingerprint image of a user that is obtained at a first fingerprint sensor;
   identifying a plurality of fingerprint template creation models, each fingerprint template creation model associated with a respective other fingerprint sensor, each other fingerprint sensor differing from one another and differing from the first fingerprint sensor;
   applying each of the fingerprint template creation models to the fingerprint image to generate respective fingerprint templates;
   associating, for each generated fingerprint template, i) an identification (ID) of the other fingerprint sensor that corresponds to the fingerprint model that generated the fingerprint template and ii) a user identification (ID) of the user associated with the fingerprint image obtained at the first fingerprint sensor; and
   storing each of the generated fingerprint templates in a database.

10. The information handling system of claim 9, the operations further comprising:
    identifying an ID of the first fingerprint sensor;
    identifying a first fingerprint template associated with the ID of the first fingerprint sensor; and
    updating the first fingerprint template based on the fingerprint image.

11. The information handling system of claim 9, wherein each fingerprint template creation model is associated with sensor size requirements of the other fingerprint sensor that is associated with the respective fingerprint template creation model.

12. The information handling system of claim 9, wherein the sensor size requirements of each fingerprint template creation model differs.

13. The information handling system of claim 9, the operations further comprising encrypting the fingerprint image.

14. The information handling system of claim 9, the operations further comprising:
    receiving an additional fingerprint image of the user that is obtained at a second fingerprint sensor;
    determining a sensor ID of the second fingerprint sensor; and
    identifying a fingerprint template from the generated fingerprint templates that is associated with a sensor ID that matches the sensor ID of the second fingerprint sensor.

15. The information handling system of claim 14, the operations further comprising decrypting the identified fingerprint template.

16. The information handling system of claim 9, wherein applying each of the fingerprint template creation models to the fingerprint image further includes performing parallel feature extraction of the fingerprint image against each of the fingerprint template creation models to generate the respective fingerprint templates.

17. A non-transitory computer-readable medium storing software comprising instructions executable by one or more computers which, upon such execution, cause the one or more computers to perform operations comprising:
receiving a fingerprint image of a user that is obtained at a first fingerprint sensor;
identifying a plurality of fingerprint template creation models, each fingerprint template creation model associated with a respective other fingerprint sensor, each other fingerprint sensor differing from one another and differing from the first fingerprint sensor;
applying each of the fingerprint template creation models to the fingerprint image to generate respective fingerprint templates;
associating, for each generated fingerprint template, i) an identification (ID) of the other fingerprint sensor that corresponds to the fingerprint model that generated the fingerprint template and ii) a user identification (ID) of the user associated with the fingerprint image obtained at the first fingerprint sensor; and
storing each of the generated fingerprint templates in a database.

18. The transitory computer-readable medium of claim 17, the operations further comprising:
identifying an ID of the first fingerprint sensor;
identifying a first fingerprint template associated with the ID of the first fingerprint sensor; and
updating the first fingerprint template based on the fingerprint image.

19. The transitory computer-readable medium of claim 17, wherein each fingerprint template creation model is associated with sensor size requirements of the other fingerprint sensor that is associated with the respective fingerprint template creation model.

20. The transitory computer-readable medium of claim 17, wherein the sensor size requirements of each fingerprint template creation model differs.

* * * * *